United States Patent
Crabtree et al.

(10) Patent No.: US 10,514,954 B2
(45) Date of Patent: Dec. 24, 2019

(54) PLATFORM FOR HIERARCHY COOPERATIVE COMPUTING

(71) Applicant: Fractal Industries, Inc., Reston, VA (US)

(72) Inventors: Jason Crabtree, Vienna, VA (US); Andrew Sellers, Monument, CO (US)

(73) Assignee: QOMPLX, INC., Reston, VA (US)

( * ) Notice: Subject to any disclaimer, the term of this patent is extended or adjusted under 35 U.S.C. 154(b) by 227 days.

(21) Appl. No.: 15/879,182

(22) Filed: Jan. 24, 2018

(65) Prior Publication Data

US 2018/0246764 A1 Aug. 30, 2018

Related U.S. Application Data

(63) Continuation-in-part of application No. 15/850,037, filed on Dec. 21, 2017, which is a continuation-in-part of application No. 15/673,368, filed on Aug. 9, 2017, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, which is a continuation-in-part of application No.
(Continued)

(51) Int. Cl.
| | |
|---|---|
| *G06F 9/46* | (2006.01) |
| *G06F 9/50* | (2006.01) |
| *G06N 5/02* | (2006.01) |
| *G06Q 10/06* | (2012.01) |
| *G06Q 30/02* | (2012.01) |
| *G06Q 40/04* | (2012.01) |

(52) U.S. Cl.
CPC ........... *G06F 9/5011* (2013.01); *G06N 5/025* (2013.01); *G06Q 10/067* (2013.01); *G06Q 30/0201* (2013.01); *G06Q 30/0205* (2013.01); *G06Q 40/04* (2013.01)

(58) Field of Classification Search
CPC ............... G06F 9/5011; G06Q 10/067; G06Q 30/0201; G06Q 30/0205; G06Q 40/04; G06N 5/025
See application file for complete search history.

(56) References Cited

U.S. PATENT DOCUMENTS

| | | | |
|---|---|---|---|
| 10,057,122 B1 * | 8/2018 | Andersen | ............... G06F 9/5072 |
| 2006/0190378 A1 | 8/2006 | Szydlo | |
| (Continued) | | | |

FOREIGN PATENT DOCUMENTS

| | | |
|---|---|---|
| WO | 0163534 A2 | 8/2001 |
| WO | 2011011942 A1 | 2/2011 |
| WO | 2015094545 A1 | 6/2015 |

*Primary Examiner* — Adam Lee
(74) *Attorney, Agent, or Firm* — Brian R. Galvin; Brian S. Boon; Galvin Patent Law LLC

(57) ABSTRACT

A system for hierarchical cooperative computing is provided, comprising a vector definition service configured to receive a user-submitted request, and compile the request into a vector; a rules engine configured to retrieve the vector from the vector definition service, and evaluate the vector for appropriateness; a parametric evaluator configured to parameterize the vector, and generate at least a run from the parameterized vector; and an optimizer configured to retrieve the run from the parametric evaluator, and determine an optimal plan for executing the user-submitted request.

12 Claims, 13 Drawing Sheets

Related U.S. Application Data

15/206,195, filed on Jul. 8, 2016, which is a continuation-in-part of application No. 15/186,453, filed on Jun. 18, 2016, which is a continuation-in-part of application No. 15/166,158, filed on May 26, 2016, which is a continuation-in-part of application No. 15/141,752, filed on Apr. 28, 2016, which is a continuation-in-part of application No. 15/091,563, filed on Apr. 5, 2016, now Pat. No. 10,204,147, which is a continuation-in-part of application No. 14/986,536, filed on Dec. 31, 2015, now Pat. No. 10,210,255, which is a continuation-in-part of application No. 14/925,974, filed on Oct. 28, 2015, application No. 15/879,182, which is a continuation-in-part of application No. 15/850,037, filed on Dec. 21, 2017, which is a continuation-in-part of application No. 15/489,716, filed on Apr. 17, 2017, which is a continuation-in-part of application No. 15/409,510, filed on Jan. 18, 2017, which is a continuation-in-part of application No. 15/379,899, filed on Dec. 15, 2016, which is a continuation-in-part of application No. 15/376,657, filed on Dec. 13, 2016, now Pat. No. 10,402,906.

(56) References Cited

U.S. PATENT DOCUMENTS

| | | |
|---|---|---|
| 2007/0012161 A1 | 1/2007 | Lyles |
| 2007/0168370 A1 | 7/2007 | Hardy |
| 2007/0240126 A1* | 10/2007 | Allen .................. G06F 9/5011 717/130 |
| 2010/0169237 A1 | 7/2010 | Howard et al. |
| 2010/0223364 A1* | 9/2010 | Wei .................. H04L 29/04 709/220 |
| 2010/0257403 A1* | 10/2010 | Virk .................. G06F 11/1453 714/15 |
| 2013/0332935 A1* | 12/2013 | Varma .................. G06F 9/5011 718/104 |
| 2014/0040975 A1 | 2/2014 | Raleigh et al. |
| 2015/0237128 A1* | 8/2015 | Castro .................. H04L 63/20 709/203 |
| 2015/0256475 A1* | 9/2015 | Suman .................. H04L 47/70 709/226 |
| 2015/0304383 A1* | 10/2015 | Carroll .................. G06F 16/9537 709/219 |
| 2015/0381425 A1* | 12/2015 | Kansal .................. H04L 41/0896 709/224 |
| 2017/0078366 A1* | 3/2017 | Jung .................. H04L 67/10 |

\* cited by examiner

PLATFORM FOR HIERARCHY COOPERATIVE COMPUTING

CROSS-REFERENCE TO RELATED APPLICATIONS

This application is a continuation-in-part of U.S. patent application Ser. No. 15/850,037 titled "ADVANCED DECENTRALIZED FINANCIAL DECISION PLATFORM", and filed on Dec. 21, 2017, which is a continuation-in-part of U.S. patent application Ser. No. 15/673,368 titled "AUTOMATED SELECTION AND PROCESSING OF FINANCIAL MODELS", and filed on Aug. 9, 2017 which is a continuation-in-part of U.S. patent application Ser. No. 15/376,657 titled "QUANTIFICATION FOR INVESTMENT VEHICLE MANAGEMENT EMPLOYING AN ADVANCED DECISION PLATFORM", and filed on Dec. 13, 2016, which is a continuation-in-part of U.S. patent application Ser. No. 15/237,625, titled "DETECTION MITIGATION AND REMEDIATION OF CYBERATTACKS EMPLOYING AN ADVANCED CYBER-DECISION PLATFORM", and filed on Aug. 15, 2016, which is a continuation-in-part of U.S. patent application Ser. No. 15/206,195, titled "ACCURATE AND DETAILED MODELING OF SYSTEMS WITH LARGE COMPLEX DATASETS USING A DISTRIBUTED SIMULATION ENGINE", and filed on Jul. 8, 2016, which is continuation-in-part of U.S. patent application Ser. No. 15/186,453, titled "SYSTEM FOR AUTOMATED CAPTURE AND ANALYSIS OF BUSINESS INFORMATION FOR RELIABLE BUSINESS VENTURE OUTCOME PREDICTION" and filed on Jun. 18, 2016, which is a continuation-in-part of U.S. patent application Ser. No. 15/166,158, titled "SYSTEM FOR AUTOMATED CAPTURE AND ANALYSIS OF BUSINESS INFORMATION FOR SECURITY AND CLIENT-FACING INFRASTRUCTURE RELIABILITY", and filed on May 26, 2016, which is a continuation-in-part of U.S. patent application Ser. No. 15/141,752, titled "SYSTEM FOR FULLY INTEGRATED CAPTURE, AND ANALYSIS OF BUSINESS INFORMATION RESULTING IN PREDICTIVE DECISION MAKING AND SIMULATION", and filed on Apr. 28, 2016, which is a continuation-in-part of U.S. patent application Ser. No. 14/925,974, titled "RAPID PREDICTIVE ANALYSIS OF VERY LARGE DATA SETS USING THE DISTRIBUTED COMPUTATIONAL GRAPH" and filed on Oct. 28, 2015, and is also a continuation-in-part of U.S. patent application Ser. No. 14/986,536, titled "DISTRIBUTED SYSTEM FOR LARGE VOLUME DEEP WEB DATA EXTRACTION", and filed on Dec. 31, 2015, and is also a continuation-in-part of U.S. patent application Ser. No. 15/091,563, titled "SYSTEM FOR CAPTURE, ANALYSIS AND STORAGE OF TIME SERIES DATA FROM SENSORS WITH HETEROGENEOUS REPORT INTERVAL PROFILES", and filed on Apr. 5, 2016, the entire specification of each of which is incorporated herein by reference in its entirety.

This application is a continuation-in-part of U.S. patent application Ser. No. 15/850,037 titled "ADVANCED DECENTRALIZED FINANCIAL DECISION PLATFORM", and filed on Dec. 21, 2017, which is a continuation-in-part of U.S. application Ser. No. 15/489,716, titled "REGULATION BASED SWITCHING SYSTEM FOR ELECTRONIC MESSAGE ROUTING" and filed on Apr. 17, 2017, which is a continuation-in-part of U.S. application Ser. No. 15/409,510, titled "MULTI-CORPORATION VENTURE PLAN VALIDATION EMPLOYING AN ADVANCED DECISION PLATFORM" and filed on Jan. 18, 2017, which is a continuation-in-part of U.S. application Ser. No. 15/379,899, titled "INCLUSION OF TIME SERIES GEOSPATIAL MARKERS IN ANALYSES EMPLOYING AN ADVANCED CYBER-DECISION PLATFORM" and filed on Dec. 15, 2016, which is a continuation-in-part of U.S. application Ser. No. 15/376,657, titled "QUANTIFICATION FOR INVESTMENT VEHICLE MANAGEMENT EMPLOYING AN ADVANCED DECISION PLATFORM" and filed on Dec. 13, 2016, the entire specification of each of which is incorporated herein by reference in its entirety.

BACKGROUND OF THE INVENTION

Field of the Invention

The disclosure relates to the field of hierarchical distributed computing systems.

Discussion of the State of the Art

In processing extremely large amounts of data, it may be imprudent to transfer the data for processing, and it may be wiser to moving the processing closer to the data for processing. This may not only decrease the demand and burden on global networks speed up, but may significantly speed up and streamline dataflows. The inverse may also occur, wherein a specialized computer system may be required to process a large amount of data.

Presently, there is an all-encompassing solution that determines plan for processes such as the one discussed above. It may be tedious to manually acquire the services needed to migrate data or processes, and also calculate costs to ensure any budgets are met.

What is needed is a system that may take a plurality of specified constraints and factors, and automatically determine an optimal plan for executing a user request for computing. Such a system should also be able to procure any additional resources, as well as identify bottlenecks in the system and provide a solution to the bottleneck.

SUMMARY OF THE INVENTION

Accordingly, the inventor has conceived, and reduced to practice, a system and method for hierarchy cooperative computing.

In a typical embodiment, a system may be configured to operate in a decentralized manner, with a centralized control point. Through the use of services and models, the control point may evaluate connections, data localities, processing localities, and the like to determine a best endpoint and plan in executing a user request for cooperative computing with regards to factors such as data and processing localities, any regulations in the aforementioned localities, costs, system available, and the like.

In one aspect of the invention, a system for hierarchical cooperative computing is provided, comprising a vector definition service comprising a memory, a processor, and a plurality of programming instructions stored in the memory thereof and operable on the processor thereof, wherein the programmable instructions, when operating on the processor, cause the processor to receive a user-submitted request comprising at least a cooperative computing request, and compile the request into a vector using at least a model definition language; a rules engine comprising a memory, a processor, and a plurality of programming instructions stored in the memory thereof and operable on the processor thereof, wherein the programmable instructions, when operating on the processor, cause the processor to retrieve the vector from the vector definition service, and evaluate the vector for appropriateness based at least on predefined rules, and data and processing localities; a parametric evaluator comprising a memory, a processor, and a plurality of programming instructions stored in the memory thereof and operable on the processor thereof, wherein the programmable instructions, when operating on the processor, cause the processor to parameterize the vector based at least on intended purpose and predefined constraints of the user-submitted request, and generate at least a run from the parameterized vector; and an optimizer comprising a memory, a processor, and a plurality of programming instructions stored in the memory thereof and operable on the processor thereof, wherein the programmable instructions, when operating on the processor, cause the processor to retrieve the run from the parametric evaluator, and determine an optimal locality for executing the user-submitted request based at least on the status of connections to the optimal locality and availability of computational resources of the optimal locality.

In another aspect of the invention, a method for hierarchical cooperative computing is provided, comprising the steps of: (a) receiving a user-submitted request comprising at least a cooperative computing request using a vector definition service; (b) compiling the request into a vector using at least a model definition language using the vector definition service; (c) retrieving the vector from the vector definition service using a rules engine; (d) evaluating the vector for appropriateness based at least on predefined rules, and data and processing localities using the rules engine; (e) parameterizing the vector based at least on intended purpose and predefined constraints of the user-submitted request using a parametric evaluator; (f) generating at least a run from the parameterized vector using the parametric evaluator; (g) retrieving the run from the parametric evaluator using an optimizer; and (h) determining an optimal locality for executing the user-submitted request based at least on the status of connections to the optimal locality and availability of computational resources of the optimal locality using the optimizer.

According to another embodiment of the invention, the system further comprises a data migration service comprising a memory, a processor, and a plurality of programming instructions stored in the memory thereof and operable on the processor thereof, wherein the programmable instructions, when operating on the processor, cause the processor to initiate migration of data associated with the user-submitted request to a different locality for processing. According to another embodiment of the invention, the system further comprises a resource modulation service comprising a memory, a processor, and a plurality of programming instructions stored in the memory thereof and operable on the processor thereof, wherein the programmable instructions, when operating on the processor, cause the processor to automatically acquire additional resources in order to execute the user-submitted request from an external service provider. According to another embodiment of the invention, the optimizer uses an external simulation service to operate an instanced copy of a compute environment in order to identify bottlenecks in the system.

According to another embodiment of the invention, the rules engine is further configured to conduct a feasibility analysis on an incoming vector. According to another embodiment of the invention, the rules engine denies a vector and submits a request for additional information.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
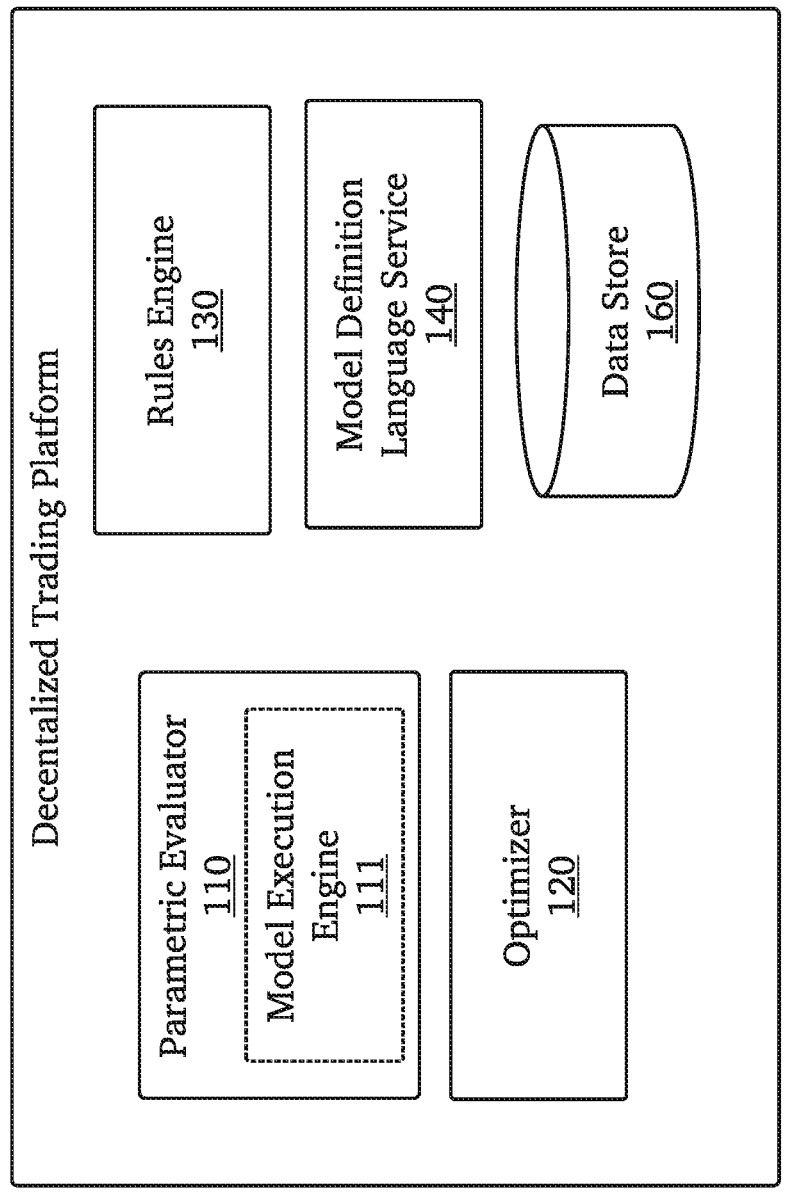
FIG. 1 is a block diagram of an exemplary system architecture for a system for decentralized trading according to various embodiments of the invention.

The inventor has conceived, and reduced to practice, a system and method for hierarchy cooperative computing.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "vector" may be defined as a container for compute instructions, and may comprise instructions and descriptions for data locality, process locality, priority, type, search, approach, and the like. Vectors may also be used in a search process, and for declaration of constraints regarding the conditions under which specific actions may be taken, limitations on inputs, limitations on outputs, limitations on downstream uses to be attached to outputs, and the like.

As used herein, a "run" may be considered to be a vector which has been evaluated and processed by a parameterized model execution engine according to various factors contributing to overall utility and objective function optimization.

Conceptual Architecture

FIG. 1 is a block diagram of an exemplary system architecture for a system 100 for decentralized trading according to various embodiments of the invention. System 100 may comprise a parametric evaluator 110, an optimizer 120, a rules engine 130, a model definition language service 140, and a data store 160. System 100 may continually monitor and track current status of connections and system states.

It should be understood that the components of system 100 may be in logical form, or may be an external service. Other embodiments of system 100 may have less components than what is shown in FIG. 1, while other embodiments may have additional components.

Parametric evaluator 110 may be configured to assess model performance and bias, and may comprise a model execution engine 111. Parametric evaluator 110 may be configured to analyze a plurality of data flow localities and priorities, and compile a list of results according to pre-defined factors, such as overall associated costs, volatility, profitability, effectiveness of global system optimizations, and the like.

Model execution engine 111 may be configured to analyze and parameterize a plurality of vectors, and their outcomes when given a plurality of factors relating to a trade, such as overall cost, effectiveness in global system optimization, profitability, volatility, and the like. The parameterization of a vector description may result in a "run", which may be sent to optimizer 120 for further processing and analysis.

Optimizer 120 may be configured to analyze "runs" that received from parametric evaluator 110, and generate recommendations regarding appropriateness of one or more data flow localities, such as regulatory issues or legality, or utility for one or more sets of exogenous factors or system states. For example, optimizer 120 may recommend a combination of data flow and storage localities based on current global system states to determine a course of action for one or more financial trades resulting in favorable outcomes by choosing whether to migrate data, migrate processes, or call into spot markets to control data and processing locality in order to minimize latency associated with execution trades across geographically distributed market centers; or analyzing hypothetical system states, such as using a simulation engine to operate an identical instance in simulation to identify current and future bottlenecks.

When used in handling of rules, optimizer 120 may be configured to define a set of rules pertaining to the appropriateness of data locality and process locality with regards to a system condition for a given purpose, for instance, for determining profitable trades, which may be expressed in a declarative formalism accessible to rules engine 130. When used in conjunction with machine learning methods, such as deep learning, transfer learning, reinforcement learning, and the like, optimizer 120 may develop an understanding of optimal models, groups of models, or rules defining model appropriateness or performance over time; and may change or restrict ordering of model packages or rules combinations based on the developed understanding.

Rules engine 130 may be configured to enable management of system rules, and also to evaluate specific elements of a given instance of one or more models when given any definition for the current or future state of said models. For example, rules engine 130 may verify that a request is allowed or appropriate based on the intended use, for example, feasibility or legality of an intended trade; whether a defined confidence requirement or other conditions are met; and evaluate configuration-specific terms and requirements as specified in user-defined operating constraints or guidelines. Rules engine 130 may evaluate rules by executing a forward chaining deduction of data amassed from a set of antecedents derived from model definition language service 140 for a particular application or purpose. Rules engine 130 supports layered "batteries" of modular tests, where functional decomposition of rules supports higher degrees of user productivity and rules re-use.

Model definition language service 140 may be configured to allow user management of models, and defining of vectors using a declarative specification language (DSL). The use of a DSL for vectorizing the compute environment and data flow descriptions may enable linking of search processes to the rules engine 130, parametric evaluator 110, and feedback loop processes during ongoing operational-use based on the ability to encode appropriateness when combined with rules engine 130, serving as a basis for deep and reinforcement learning to support ongoing improvement to functions of optimizer 120. Model definition language service 140 may also enable a user or an autonomous trading system to initiate evaluation of specific pipelines, activities, overall system health, and the like of a specific instance of system 100.

Figure 2:
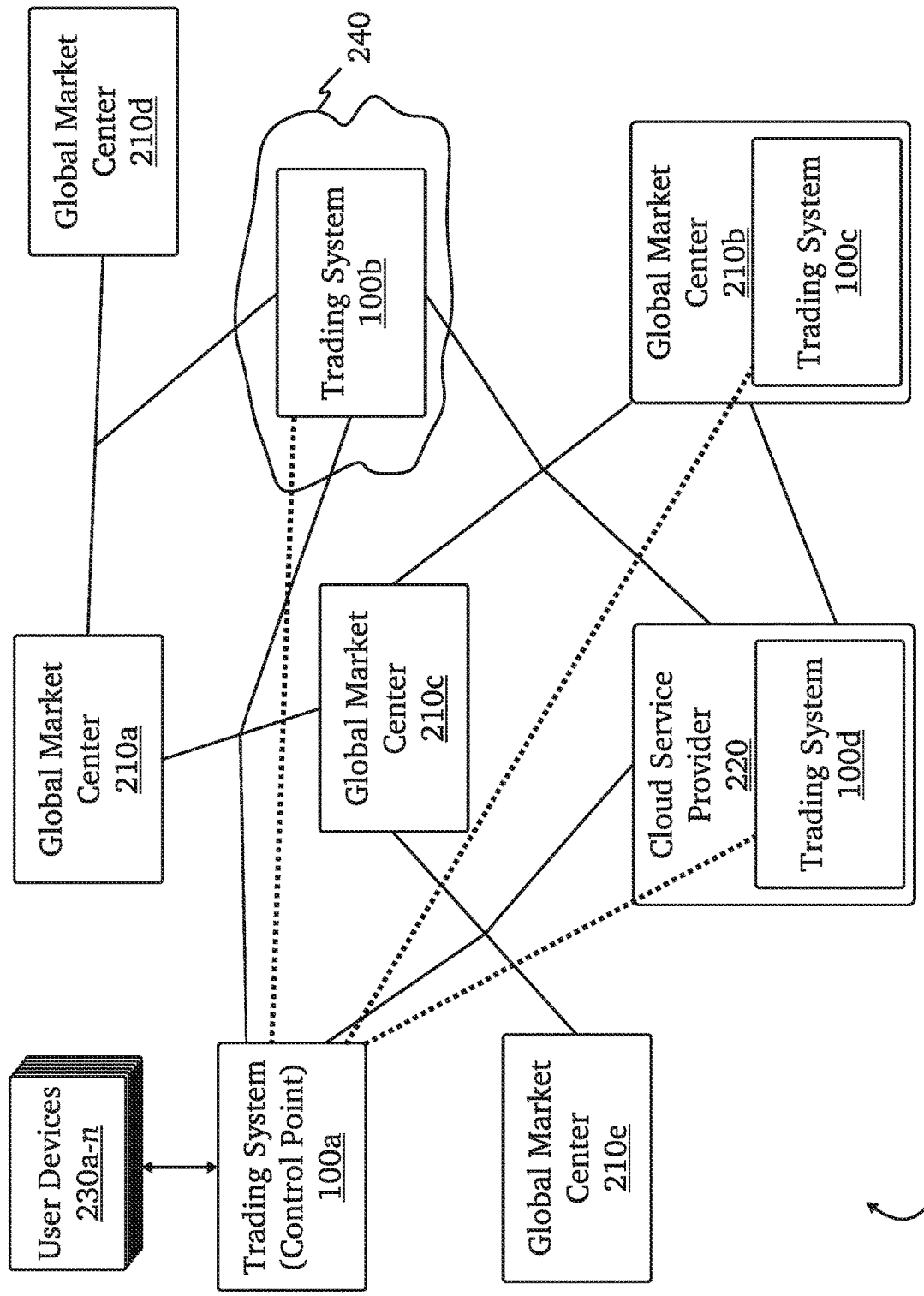
FIG. 2 is an illustration of an exemplary topography of a system employing a plurality of decentralized trading systems according to various embodiments of the invention.

FIG. 2 is an illustration of an exemplary topography 200 of a system employing a plurality of decentralized trading systems 100*a-d* according to various embodiments of the invention. Topography 200 is an example of a layout of various components within a geographical area, for example spanning a continent or even on a global scale, and illustrates a plurality of systems 100*a-d* connecting with a plurality of user global market centers 210*a-e*, such as a stock market or foreign exchange markets, through a wide area network connection; and a plurality of user devices 230*a-n*, which may be a single user or group of users accessing trading platform 100*a* through, for example, a web application, mobile device, spatial operating system, AR or VR system, and the like.

Systems 100*a-d* may be flexible in their placement and locale, which may include, for example, as a standalone system 100*a*; running in a virtual machine of a cloud service provider, such as AMAZON AWS 220, 100*d*; residing inside a global market center 210*b*, 100*c*; or even submerged in a body of water 240, 100*b*, for example inside a mobile submersible data center. Locations for systems 100*a-d* may be strategically chosen, so that they may be useful in operating as an intermediate connection to a trading market. Topography 200 utilizes a centralized control point in system 100*a* for users to communicate with decentralized deployment of a plurality of instances of system 100*b-d*. Any particular instance may be chosen by an optimizer of system 100*a* as the locality for data processing and storage; or system in which to execute a trade based on metrics such as system availability, latency to reach a target global market for trading a certain asset, and the like.

It should be understood that the layout and components depicted in FIG. 2 is used for demonstration purposes, and does not represent a limitation of the present invention. For example, there may be more than one control point, more decentralized trading system endpoints, more global markets, and the like.

Figure 3:
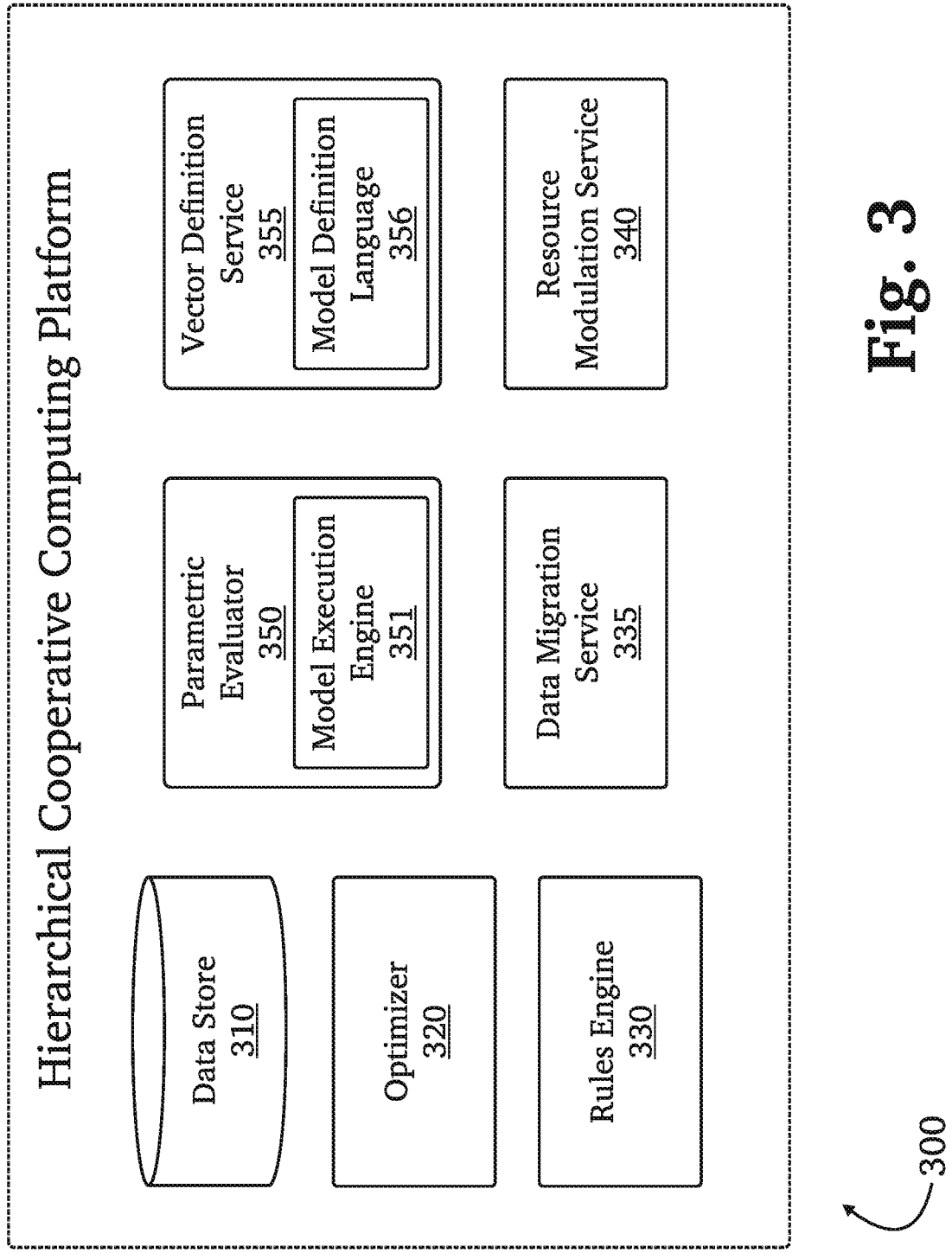
FIG. 3 is a block diagram of an exemplary system architecture 300 of a platform for hierarchical cooperative computing according to various embodiments of the invention.

With some reconfiguration and additional components, the system discussed above may be adapted for a more generalized application in a hierarchical cooperative computing system. FIG. 3 is a block diagram of an exemplary system architecture 300 of a platform for hierarchical cooperative computing according to various embodiments of the invention. System 300 may comprise an optimizer 320, a rules engine 330, a data migration service 335, a resource modulation service 340, a parametric evaluator 350, a vector definition service 355, and a data store 310 for storing data such as rules, vectors, runs, user-defined constraints, and the like. It should be understood that the components of system 300 may be implemented in logical form, or may be an external service. Other embodiments of system 300 may have less components than what is shown in FIG. 3, while other embodiments may have additional components.

Optimizer 320 may be configured to analyze "runs" received from parametric evaluator 350, and generate recommendations regarding appropriateness of one or more data flow localities, such as regulatory issues or legality, or utility for one or more sets of exogenous factors or system states. For example, optimizer 320 may recommend a combination of data flow and storage localities based on current global system states to determine a course of action for one or more financial trades resulting in favorable outcomes by choosing whether to migrate data, migrate processes, or call into spot markets to control data and processing locality in order to minimize latency associated with connection latency; or analyzing hypothetical system states, such as using simulation services to operate an identical instance in simulation to identify current and future bottlenecks. When used in conjunction with machine learning methods, such as deep learning, transfer learning, reinforcement learning, and the like, optimizer 320 may develop an understanding of optimal models, groups of models, or rules defining model appropriateness or performance over time. Optimizer 320 may then use this developed knowledge to change or restrict ordering of model packages or rules combinations based on the developed understanding.

Figure 4:
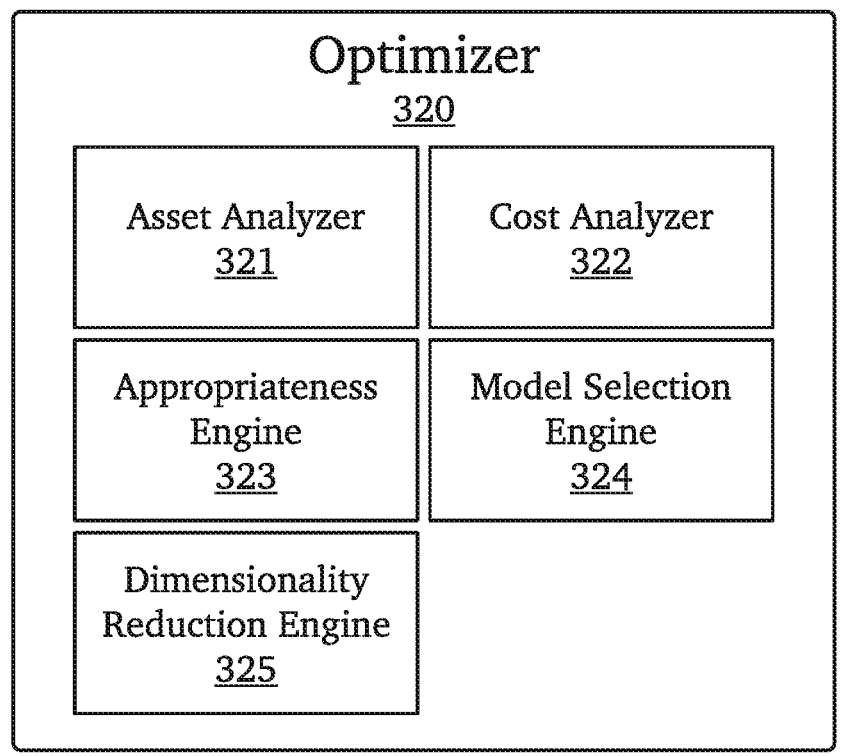
FIG. 4 is a block diagram of an exemplary optimizer used in a platform for hierarchical cooperative computing according to various embodiments of the invention.

Optimizer 320, referring to FIG. 4, may comprise an asset analyzer 321, a cost analyzer 322, an appropriateness engine 323, a model selection engine 324, and a dimensionality reduction engine 325. Asset analyzer 321 may be configured to evaluate available assets and chooses an optimal set of assets based on cost, speed, availability, and the like based on requirements specified by a user submitting a request. Asset manager may also keep track of statuses of all deployed instances of system 300. Cost analyzer 322 may be configured to analyze cost associated with using available resources, or acquiring external resources (such as starting a new instance on a cloud computing service such as AMAZON AWS). Appropriateness engine 323 may be configured to allow defining a set of rules pertaining to the appropriateness of data locality and process locality with regards to a system condition for a given purpose, for instance, to prohibit migrating and processing data in a region with conflicting data import and export laws. Model selection engine 324 may be configured to choose best-performing models for any particular intended purpose, and also adjust orders of model packages based on developed understanding from processing data over time. Dimensionality reduction engine 325 may be configured to utilize a plurality of heuristic search algorithms to reduce dimensionality for optimization purposes. Search algorithms may include, for instance, grid, brute force, Monte Carlo tree search, simulated annealing, genetic algorithms, and the like.

Rules engine 330 may be configured to enable management of system rules, and also to evaluate specific elements of a given instance of one or more vectors when given any definition for the current or future state of said vectors. For example, rules engine 330 may verify that a request is allowed or appropriate based on the intended use, for instance, feasibility or legality of an intended computing request from a user; whether a defined confidence requirement or other conditions are met; and evaluate configuration-specific terms and requirements as specified in user-defined operating constraints or guidelines. Rules engine 330 may evaluate vectors by executing a forward chaining deduction of data amassed from a set of antecedents derived from the model definition language for a particular application or purpose. Rules engine 330 supports layered "batteries" of modular tests, where functional decomposition of rules supports higher degrees of user productivity and rules re-use.

Data migration service 335 may be configured to trigger migration of data, connect to external services and facilitate the migration of data for computing, such as AMAZON SNOWBALL and SNOWMOBILE services when required by other components of system 300.

Resource modulation service 340 may be configured to dynamically acquire additional resources when required by other components of system 300. For example, when required by optimizer 320, additional instances may be started a cloud computing platform such as AMAZON AWS, or additional cloud storage space may be acquired.

Parametric evaluator 350 may be configured to assess model performance and bias, and may comprise a model execution engine 351. Parametric evaluator 350 may be configured to analyze a plurality of data flow localities and priorities, and compile a list of results according to pre-defined requirements, such as overall associated costs, effectiveness of global system optimizations, and the like. Model execution engine 351 may be configured to analyze and parameterize a plurality of vectors, and their generated outcomes when given a plurality of factors relating to an intended purpose, such as overall cost, effectiveness in global system optimization, urgency, and the like. The parameterization of a vector description may result in a "run", which may be sent to optimizer 320 for further processing and analysis.

Vector definition service 355 may be configured to allow user management of models, and defining of vectors using a model definition language 356 (MDL), which may be a flexible declarative specification language designed to efficiently and uniformly express vectors and models used by system 300. The use of MDL 356 for vectorizing the compute environment and data flow descriptions may enable linking of search processes to the rules engine 330, parametric evaluator 350, and feedback loop processes during ongoing operational-use based on the ability to encode appropriateness when combined with rules engine 330, serving as a basis for deep and reinforcement learning to support ongoing improvement to functions of optimizer 320. Model definition service 355 may also enable a user or an autonomous intelligent system to initiate evaluation of specific pipelines, activities, overall system health, and the like of a specific instance of system 300.

Figure 5:
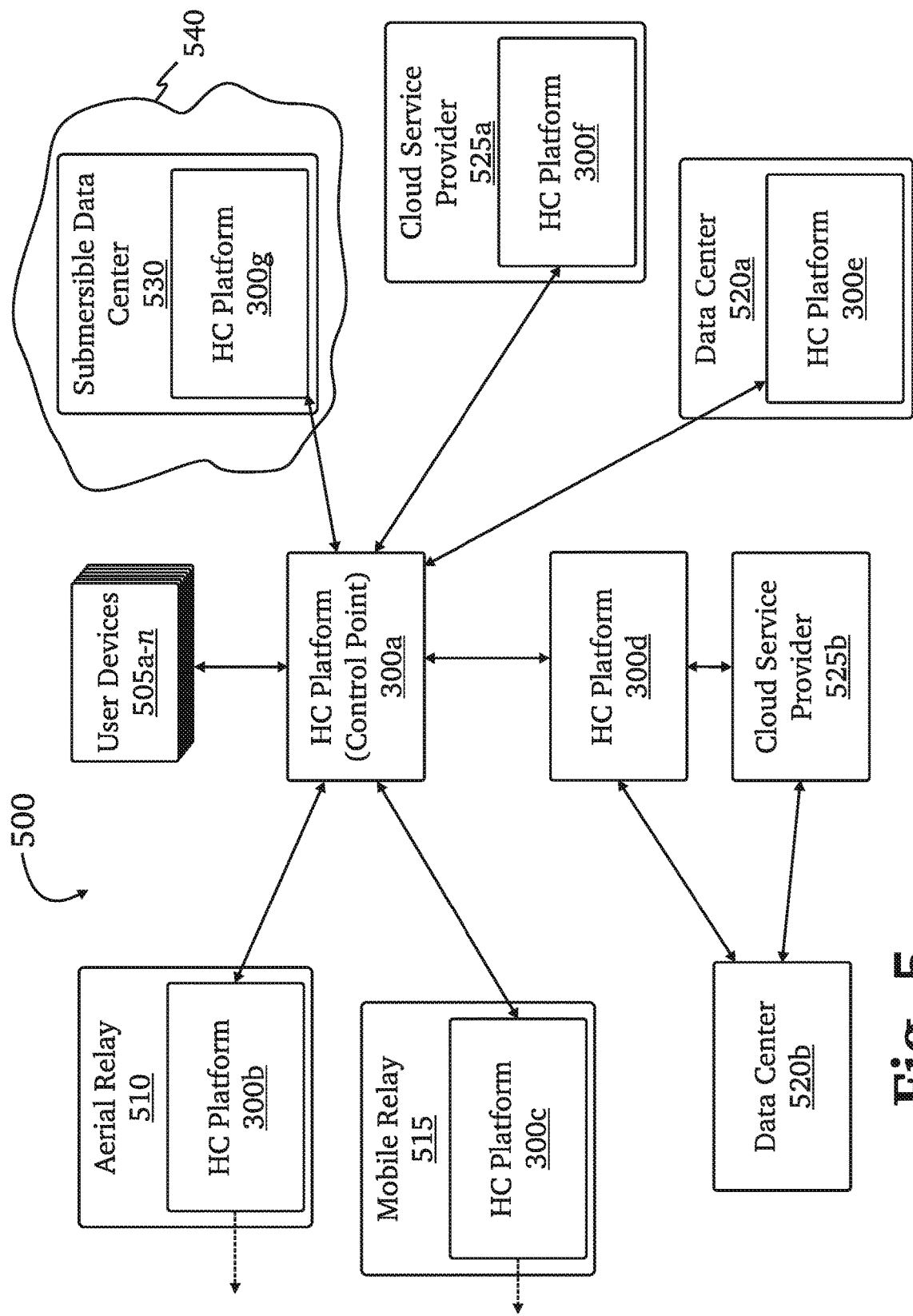
FIG. 5 is an illustration of an exemplary topography of a system employing a platform for hierarchical cooperative computing according to various embodiments of the invention.

FIG. 5 is an illustration of an exemplary topography 500 of a system employing a platform for hierarchical cooperative computing 300 according to various embodiments of the invention. Topography 500 is an example of a layout of various components within a geographical area, for example spanning a continent or even on a global scale, and illustrates a plurality of systems 300a-g used in various configurations, such as deployed on an aerial relay 510, a mobile relay 515, as a stand-alone service as in system 300d acting as an intermediary connection to cloud service provider 525b and data center 520b, inside of a data center 520a, inside of a cloud service provider 525a, and inside of a submersible data center 530 in a body of water 540 which may all be connected through a wide area network connection. A plurality of user devices 505a-n may provide a single user or group of users a means for accessing control point system 300a through, for example, a web application, mobile device, spatial operating system, AR or VR system, and the like.

Topography 500 utilizes a centralized control point in system 300a which may receive a user request from any of devices 505a-n, and determine an endpoint amongst systems 300b-g for processing the request. Any particular deployment of system 300 may be chosen by an optimizer of system 300a as the locality for storage or processing locality based on specified factors, such as system availability, connection latency, and the like. For example, if a user requires mining of an enormous cache of gathered data, it may be imprudent to transfer data to a distant processing location. System 300 may instead utilize a mobile relay to adjust the processing locality to be closer to the processing point. Or system 300 may initiate migration of data to a capable facility for processing the data.

It should be understood that the layout and components depicted in FIG. 5 is used for demonstration purposes, and does not represent a limitation of the present invention. For example, there may be more than one control point, more decentralized system endpoints, more data centers, more cloud computing services, more relays, and the like. Each endpoint may also be configured to be a control point for a plurality of localized endpoints.

Detailed Description of Exemplary Aspects

Figure 6:
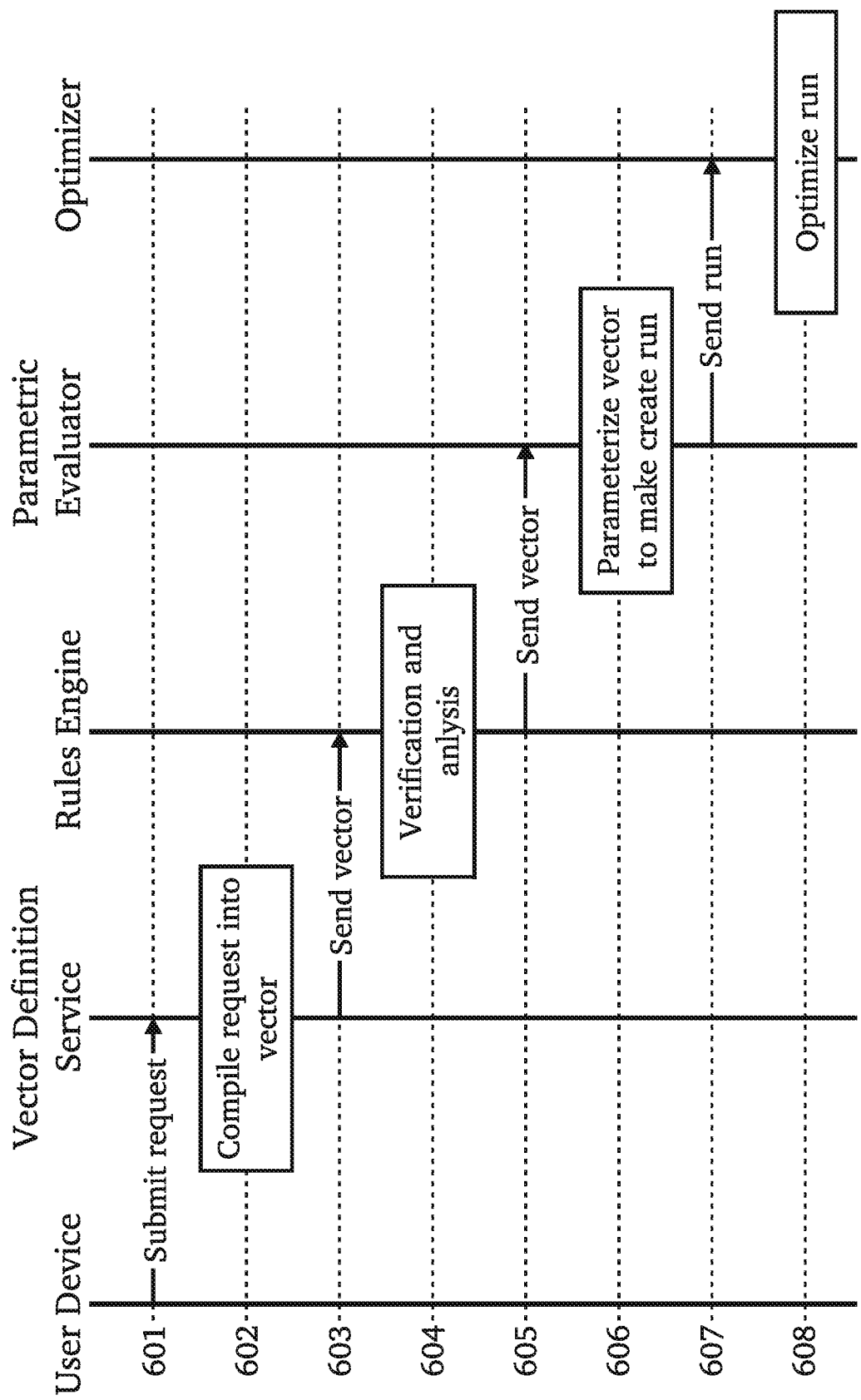
FIG. 6 is a sequence flow diagram illustrating an exemplary sequence 600 for processing a hierarchical cooperative computing-related request according to various embodiments of the invention.

FIG. 6 is a sequence flow diagram illustrating an exemplary sequence 600 for processing a hierarchical cooperative computing-related request according to various embodiments of the invention. At an initial step 601, a user submits a user request using a user device. At step 602, vector definition service 355 may compile the request into a vector specified using model definition language 356. At step 603, the vector may be sent to rules engine 330 for processing. At step 604, rules engine 330 processes the vector, which may include verification of the vector, whether system resources are available or acquirable, whether a request is appropriate or allowed based on intended use and regional regulations, whether the request is within user-defined constraints, and the like. At step 605, after being successfully processed by rules engine 330, the vector may be sent to parametric evaluator 350. A process for handling a failed verification is detailed in FIG. 7. At step 606, the vector may be evaluated and parameterized using parametric evaluator 350 and model execution engine 351, which generates a run. At step 607, the run may be sent to optimizer 320 for determining an optimal plan for executing the original request. At step 608, optimizer 320 may determine an optimal course of action to execute the original user request. This may be based on such metrics as cost, latency, appropriateness, resource availability, and the like.

To provide an example, a request may be submitted to acquire cloud computer resources for the purposes of processing a large amount of data located at a data center. The request is compiled into a vector and sent to the rules engine. The rules engine evaluates the request based on requirements, data and processing locality, and the like to determine whether the request is possible based on the provided information, any existing regulations, and the like. For the purposes of this example, the vector is successfully verified. The vector is then sent to the parametric evaluator, where performance for models associated with the vector are measured. The vector may then be parameterized based on specified requirements and constraints, which generates one or more runs. The runs may then be sent to the optimizer for more in-depth planning, and execution.

Figure 7:
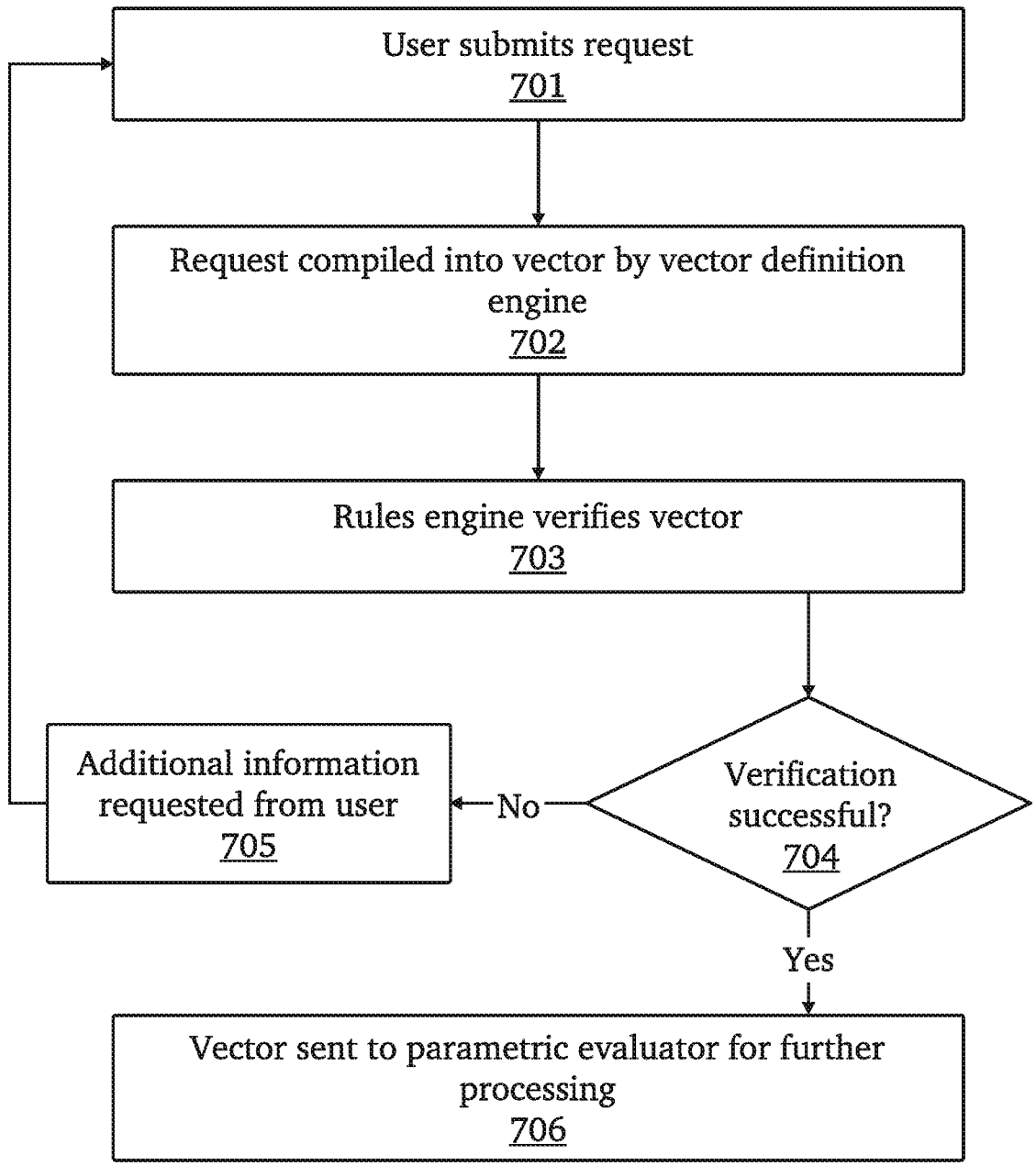
FIG. 7 is a flow diagram illustrating an exemplary method 700 for verification of a vector using a rules engine according to various embodiments of the invention.

FIG. 7 is a flow diagram illustrating an exemplary method 700 for verification of a vector using a rules engine according to various embodiments of the invention. At an initial step 701, a user submits a hierarchical cooperative computing-related request. At step 702, vector definition service 355 may compile the request into a vector specified using model definition language 356. At step 703, the vector may be sent to rules engine 330 for verification of the vector which may include whether system resources are available or procurable, whether a sufficient amount of information is provided, whether a request is appropriate or allowed based on intended use, whether the request is within user-defined constraints, and the like. At decision block 704, if the verification was unsuccessful, additional information or adjustments to the request may be requested from the user at step 705. After providing additional information, the user may resubmit the request. If the verification was successful at decision block 704, the vector may be sent to the parametric evaluator for further processing at step 706.

Figure 8:
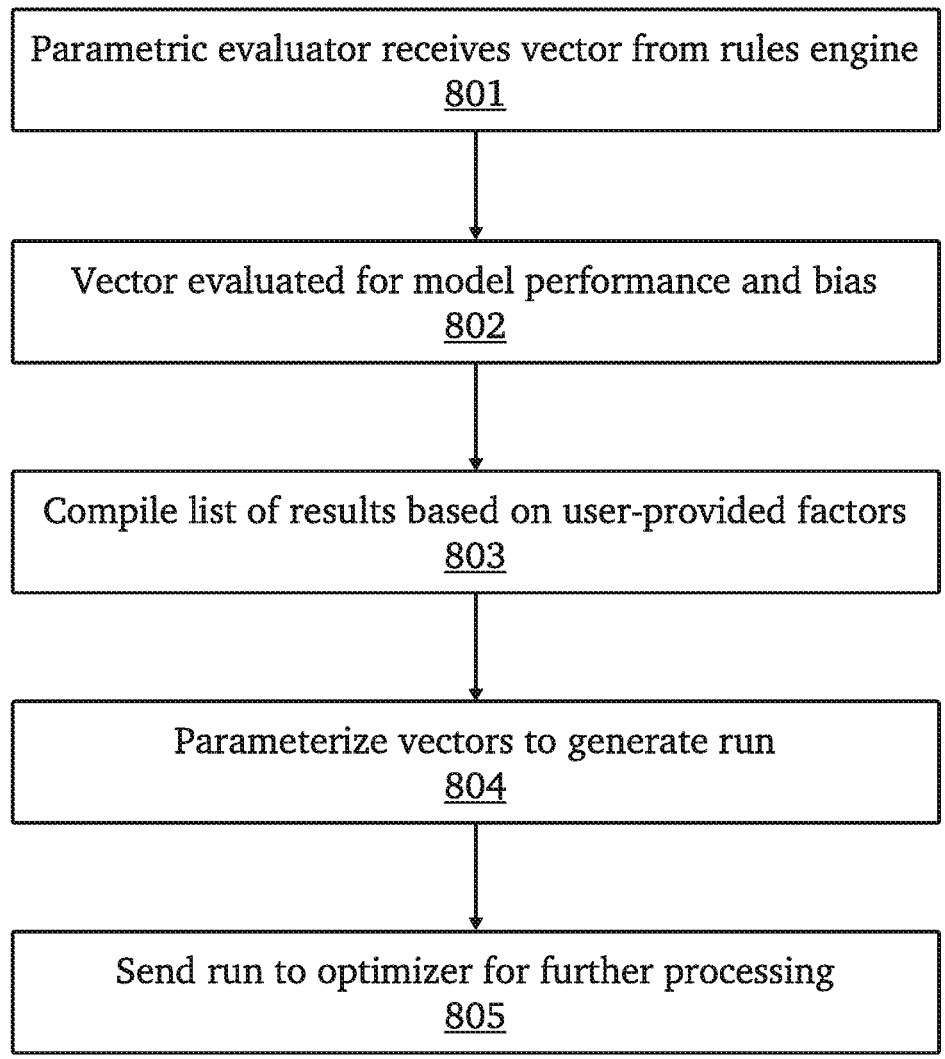
FIG. 8 is a flow diagram illustrating an exemplary method 800 for parameterizing vectors according to various embodiments of the invention.

FIG. 8 is a flow diagram illustrating an exemplary method 800 for parameterizing vectors according to various embodiments of the invention. At an initial step 801, parametric evaluator 350 receives a vector that has been previously verified by rules engine 330. At step 802, the vector may be evaluated by parametric evaluator 350 for model performance and bias. At step 803, a list of results may be generated based on user-provided factors, such as cost restrictions, intended use, data and processing locality requirements, and the like. At step 804, parametric evaluator 350 may use the model execution engine to process and parameterize the vector and evaluation outcomes to generate one or more runs. At step 805, the one or more runs may be sent to an optimizer for determining an optimal plan for execution.

Figure 9:
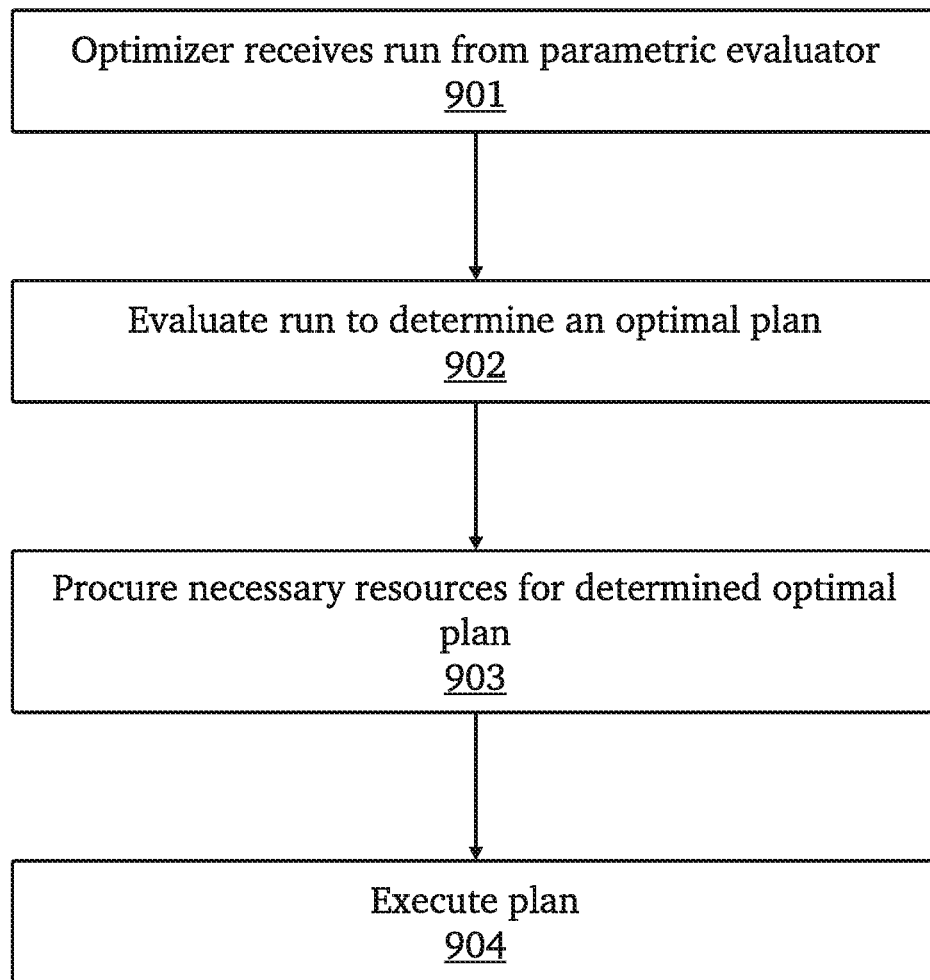
FIG. 9 is a flow diagram illustrating an exemplary method 900 for generating an optimal plan according to various embodiments of the invention.

FIG. 9 is a flow diagram illustrating an exemplary method 900 for generating an optimal plan according to various embodiments of the invention. At an initial step 901, optimizer 320 may receive one or more runs previously generated by a parametric evaluator. At step 902, the runs may be evaluated to determine one or more optimal plans. Evaluation may include, for instance, analysis of available assets and their current status, analysis of associated costs, dimensionality reduction, appropriateness of intended purpose, and the like. An optimal plan may include, for example, recommending a certain combination of data flows and storage localities, whether to migrate data localities, whether to migrate processing locality, and the like. At step 903, the optimizer may use components of system 300, for example, the data migration service or resource modulation service, to migrate data, procure resources, and the like in order to execute the determined optimal plan. In some embodiments, this step and the next step may be withheld until a user authorizes the plan. In other embodiments, triggers may be predefined (such as allocating a certain budget or completion within a specified time period) and the plan may automatically execute only after one or more triggers are met. At step 904, once all the required resources are in-place, the plan may be executed.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
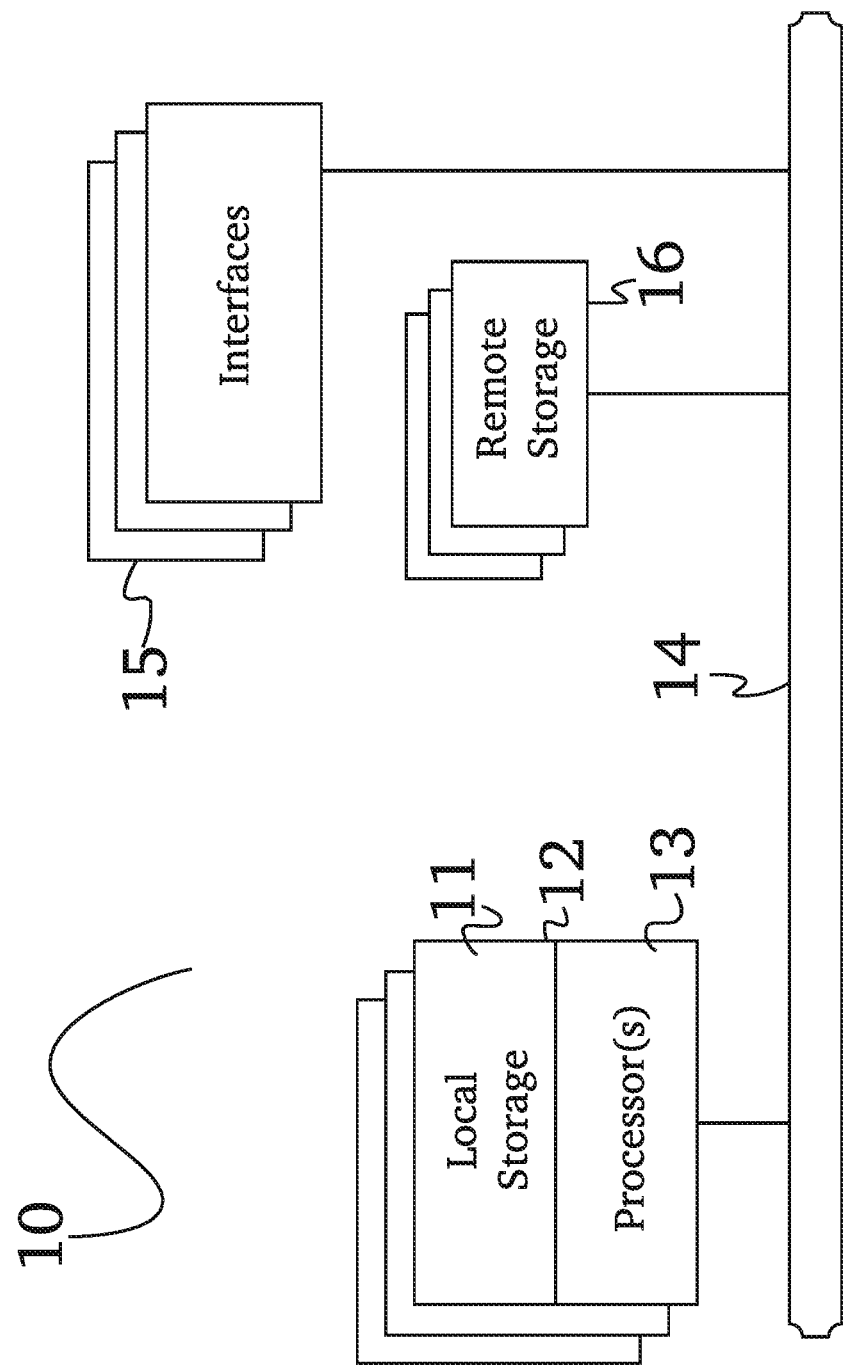
FIG. 10 is a block diagram illustrating an exemplary hardware architecture of a computing device used in various embodiments of the invention.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
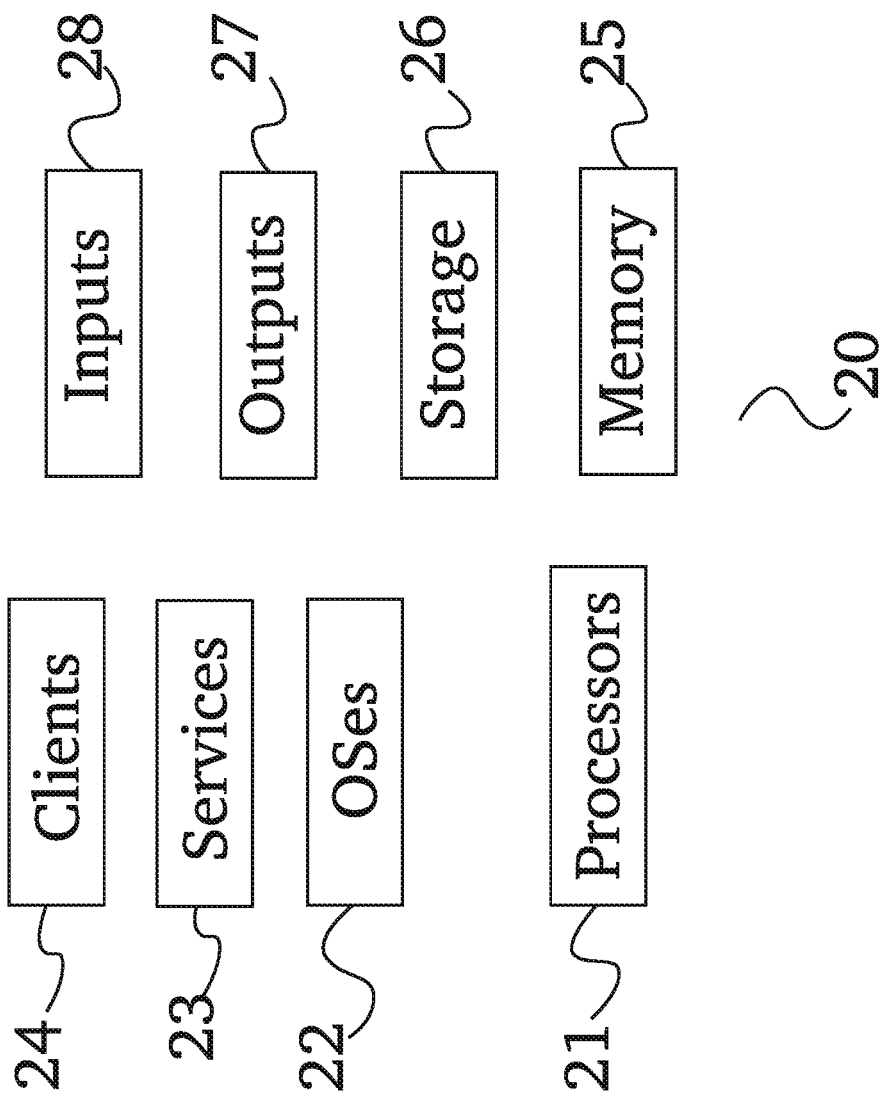
FIG. 11 is a block diagram illustrating an exemplary logical architecture for a client device, according to various embodiments of the invention.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
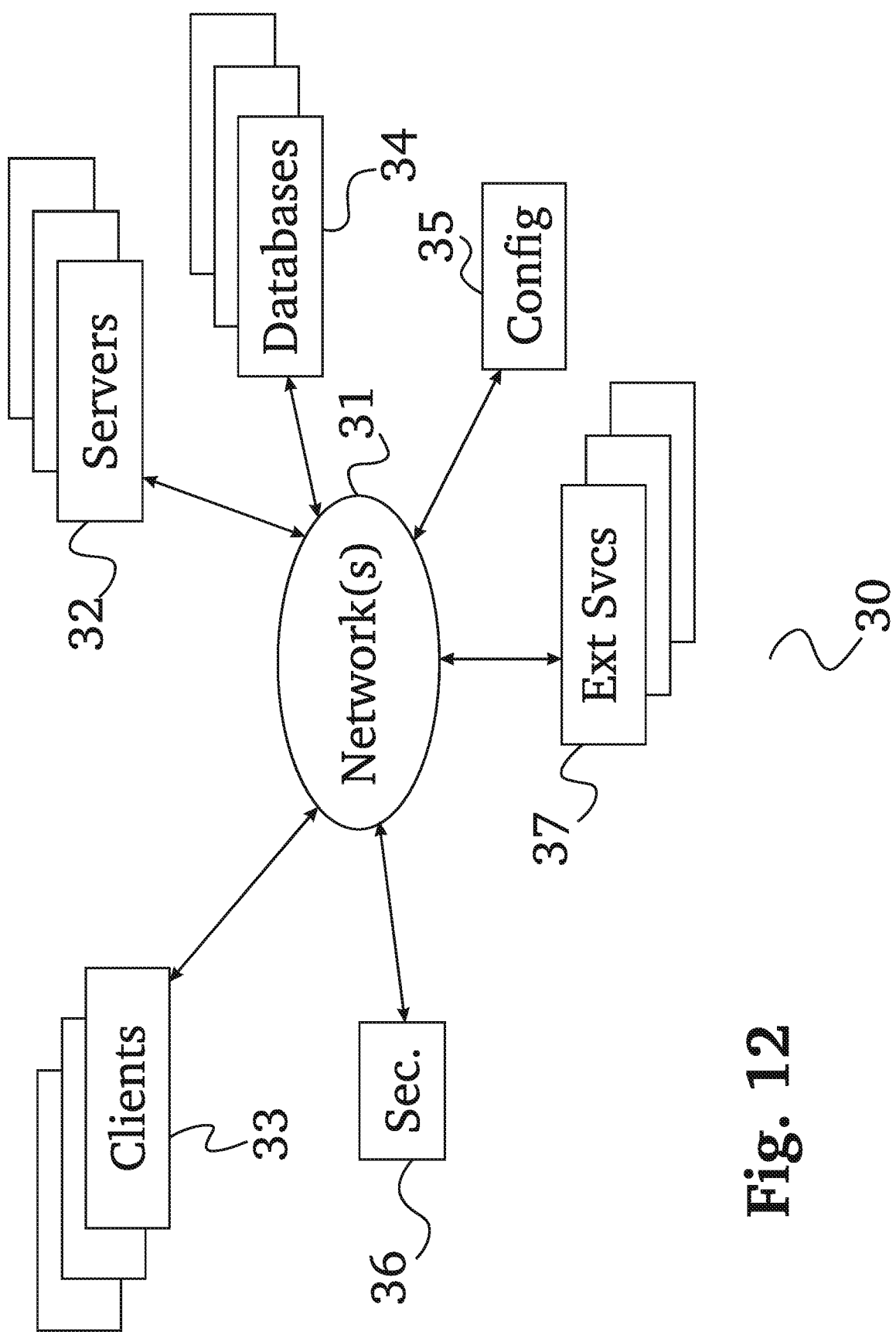
FIG. 12 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
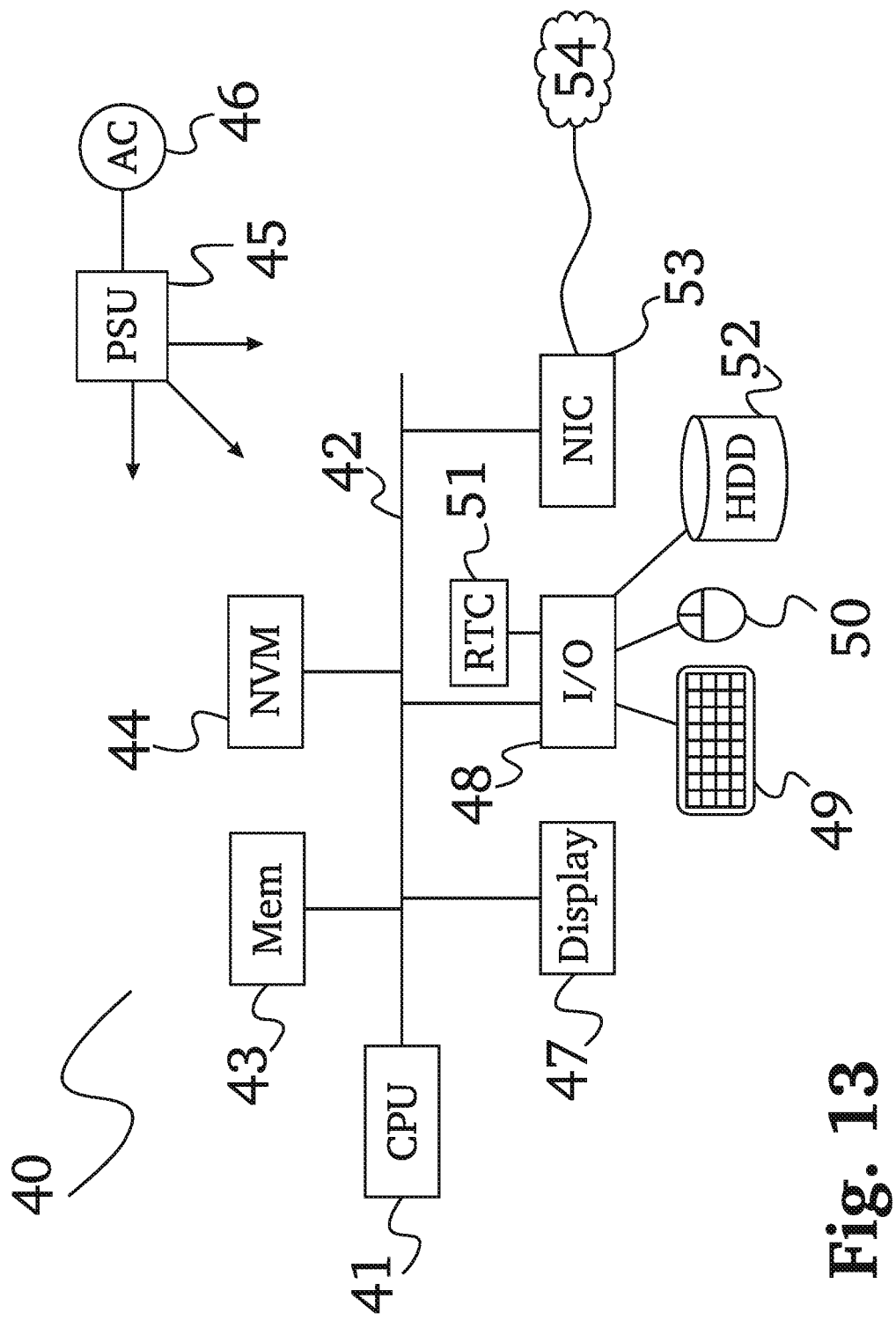
FIG. 13 is another block diagram illustrating an exemplary hardware architecture of a computing device used in various embodiments of the invention.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for hierarchical cooperative computing, comprising:
a vector definition service platform comprising a memory, a processor, and a plurality of programming instructions stored in the memory thereof and operable on the processor thereof, wherein the programming instructions, when operating on the processor, cause the processor to:
receive a user-submitted request comprising at least a cooperative computing request; and
compile the request into a vector using at least a model definition language;
a rules engine comprising a memory, a processor, and a plurality of programming instructions stored in the memory thereof and operable on the processor thereof, wherein the programming instructions, when operating on the processor, cause the processor to:
retrieve the vector from the vector definition service platform; and
evaluate the vector for appropriateness based at least on predefined rules, data associated with the user-submitted request, and processing localities;
a parametric evaluator comprising a memory, a processor, and a plurality of programming instructions stored in the memory thereof and operable on the processor thereof, wherein the programming instructions, when operating on the processor, cause the processor to:
parameterize the vector based at least on an intended purpose of the user-submitted request and predefined constraints included in the user-submitted request; and
generate at least a run from the parameterized vector; and
an optimizer comprising a memory, a processor, and a plurality of programming instructions stored in the memory thereof and operable on the processor thereof, wherein the programming instructions, when operating on the processor, cause the processor to:
retrieve the run from the parametric evaluator; and
determine an optimal plan for executing the user-submitted request based at least on the run, wherein the optimal plan includes executing the user-submitted request in an optimal processing locality of the processing localities, and wherein the optimal processing locality is determined based at least on the status of connections from the system to the optimal processing locality and availability of computational resources of the optimal processing locality.

2. The system of claim 1, further comprising:
a data migration service platform comprising a memory, a processor, and a plurality of programming instructions stored in the memory thereof and operable on the processor thereof, wherein the programming instructions, when operating on the processor, cause the processor to:
initiate migration of the data associated with the user-submitted request from one processing locality to a different processing locality for processing.

3. The system of claim 1, further comprising:
a resource modulation service platform comprising a memory, a processor, and a plurality of programming instructions stored in the memory thereof and operable on the processor thereof, wherein the programming instructions, when operating on the processor, cause the processor to:
automatically acquire additional resources for the optimal processing locality to execute the user-submitted request from a service provider external to the optimal processing locality.

4. The system of claim 1, wherein the optimizer uses a simulation service external to the optimizer to operate an instanced copy of a compute environment to identify bottlenecks in the system.

5. The system of claim 1, wherein the rules engine is further configured to conduct a feasibility analysis on the vector.

6. The system of claim 5, wherein the rules engine denies the vector and submits a request to the vector definition service platform for additional information.

7. A method for hierarchical cooperative computing, comprising the steps of:
receiving a user-submitted request comprising at least a cooperative computing request using a vector definition service;
compiling the request into a vector using at least a model definition language using the vector definition service;
retrieving the vector from the vector definition service using a rules engine;
evaluating the vector for appropriateness based at least on predefined rules, data associated with the user-submitted request, and processing localities using the rules engine;
parameterizing the vector based at least on an intended purpose of the user-submitted request and predefined constraints included in the user-submitted request using a parametric evaluator;

generating at least a run from the parameterized vector using the parametric evaluator;

retrieving the run from the parametric evaluator using an optimizer; and determining an optimal plan for executing the user-submitted request based at least on the run, wherein the optimal plan includes executing the user-submitted request in an optimal processing locality of the processing localities, and wherein the optimal processing locality is determined based at least on the status of connections from a system to the optimal processing locality and availability of computational resources of the optimal processing locality using the optimizer.

8. The method of claim 7, further comprising:

initiating migration of the data associated with the user-submitted request from one processing locality to a different processing locality for processing using a data migration service.

9. The method of claim 7, further comprising:

automatically acquiring additional resources for the optimal processing locality to execute the user-submitted request from a service provider external to the optimal processing locality using a resource modulation service.

10. The method of claim 7, wherein the optimizer uses a simulation service external to the optimizer to operate an instanced copy of a compute environment to identify bottlenecks in the system.

11. The method of claim 7, wherein the rules engine is further configured to conduct a feasibility analysis on the vector.

12. The method of claim 11, wherein the rules engine denies the vector and submits a request to the vector definition service platform for additional information.

* * * * *